(12) United States Patent
Holmes et al.

(10) Patent No.: US 9,586,575 B2
(45) Date of Patent: Mar. 7, 2017

(54) POWERTRAIN FOR A VEHICLE

(71) Applicant: GM GLOBAL TECHNOLOGY OPERATIONS LLC, Detroit, MI (US)

(72) Inventors: Alan G. Holmes, Clarkson, MI (US); Venkata Prasad Atluri, Farmington Hills, MI (US); Chandra S. Namuduri, Troy, MI (US); Robert S. Conell, Sterling Heights, MI (US); Michael G. Reynolds, Troy, MI (US); Thomas Wolfgang Nehl, Shelby Township, MI (US); Bob R. Powell, Birmingham, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/274,531

(22) Filed: Sep. 23, 2016

(65) Prior Publication Data

US 2017/0008469 A1  Jan. 12, 2017

Related U.S. Application Data

(63) Continuation of application No. 15/155,646, filed on May 16, 2016, now Pat. No. 9,475,481, which is a continuation of application No. 14/208,444, filed on Mar. 13, 2014, now Pat. No. 9,370,992.

(51) Int. Cl.
*B60W 10/26* (2006.01)
(52) U.S. Cl.
CPC .................................. *B60W 10/26* (2013.01)

(58) Field of Classification Search
CPC ........... B60K 6/28; B60K 6/485; B60K 6/365
See application file for complete search history.

(56) References Cited

U.S. PATENT DOCUMENTS

| 7,267,090 B2 * | 9/2007 | Tamai | B60L 11/1868 |
| | | | 123/179.3 |
| 7,766,788 B2 * | 8/2010 | Shamoto | B60K 6/365 |
| | | | 477/3 |
| 2011/0034282 A1 * | 2/2011 | Akutsu | B60K 6/26 |
| | | | 475/5 |

FOREIGN PATENT DOCUMENTS

| CN | 102795119 A | 11/2012 |
| CN | 103332156 A | 10/2013 |

* cited by examiner

*Primary Examiner* — John Walters
*Assistant Examiner* — James Triggs
(74) *Attorney, Agent, or Firm* — Quinn Law Group, PLLC

(57) ABSTRACT

An electrical system includes an engine, a motor-generator and a starter mechanism, and engine systems also include the engine. The electrical system includes a first energy storage device having a first voltage level and a second energy storage device having a second voltage level less than the first voltage level. The electrical system further includes a controller configured to control the motor-generator, the starter mechanism and first and second switching devices. Current from at least one of the first and second energy storage devices is delivered to the motor-generator when at least one of the first switching device is in a first closed state and the second switching device is in a second closed state such that the motor-generator transfers torque to the starter mechanism and the starter mechanism uses the torque to start the engine.

20 Claims, 2 Drawing Sheets

POWERTRAIN FOR A VEHICLE

CROSS-REFERENCE TO RELATED APPLICATIONS

This application is a continuation of U.S. patent application Ser. No. 15/155,646, filed on May 16, 2016, which is a continuation application of U.S. patent application Ser. No. 14/208,444, filed on Mar. 13, 2014, now U.S. Pat. No. 9,370,992, which are hereby incorporated by reference in their entirety.

TECHNICAL FIELD

The present disclosure relates to a powertrain for a vehicle.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle utilizes both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine usually by a belt and pulley system. The motor-generator can restart the engine when a brake is released at a stop light and the motor-generator can be rotated by the engine during regenerative braking. This type of hybrid vehicle utilizes a starter motor independent of the motor-generator to start the engine when the engine has been shut off for an extended period of time. The starter motor and the motor-generator operate separately, i.e., not coupleable to each other.

The BAS can be in electrical communication with a first energy storage device. The vehicle can have an electrical system that runs various vehicle accessories such as headlights, HVAC devices, auxiliary motors and entertainment system components. Any current exiting the BAS is fed to the first energy storage device before the current can reach the electrical system, and thus, the electrical system is not powered directly by the BAS.

SUMMARY

The present disclosure provides an electrical system including an engine, a motor-generator and a starter mechanism. The electrical system also includes a first energy storage device having a first voltage level and a second energy storage device having a second voltage level less than the first voltage level. Additionally, the electrical system includes a first switching device selectively transitionable between a first open state and a first closed state, and a second switching device selectively transitionable between a second open state and a second closed state. The electrical system further includes a controller, with the controller including a processor and a memory having recorded instructions. The controller is configured to control the motor-generator, the starter mechanism and the first and second switching devices. Current from at least one of the first and second energy storage devices is delivered to the motor-generator when at least one of the first switching device is in the first closed state and the second switching device is in the second closed state such that the motor-generator transfers torque to the starter mechanism and the starter mechanism uses the torque to start the engine.

The present disclosure also provides an engine system including an engine. The engine includes a housing and a crankshaft at least partially disposed inside the housing. The engine system also includes a motor-generator disposed outside of the housing and a starter mechanism coupleable to the engine. The engine system further includes an auxiliary electric system operatively connected to the motor-generator. The motor-generator is operable in a predetermined operating mode in which the motor-generator alone supplies current to the auxiliary electric system. Additionally, the engine system includes a first energy storage device disposed in a parallel electrical relationship with the motor-generator and the auxiliary electric system. Furthermore, the engine system includes a first switching device selectively transitionable between a first open state to electrically disconnect the first energy storage device from the motor-generator and the auxiliary electric system, and a first closed state to electrically connect the first energy storage device to at least one of the motor-generator and the auxiliary electric system. Current from the first energy storage device is delivered to at least one of the motor-generator and the starter mechanism when the first switching device is in the first closed state such that the starter mechanism starts the engine.

The present disclosure provides another engine system including an engine. The engine includes a housing and a crankshaft at least partially disposed inside the housing. The engine system also includes a motor-generator disposed outside of the housing and a gearbox coupleable to the engine. Additionally, the engine system includes an auxiliary electric system operatively connected to the motor-generator. The motor-generator is operable in a predetermined operating mode in which the motor-generator alone supplies current to the auxiliary electric system. The engine system further includes a first energy storage device disposed in a parallel electrical relationship with the motor-generator and the auxiliary electric system. The engine system also includes a first switching device selectively transitionable between a first open state to electrically disconnect the first energy storage device from the motor-generator and the auxiliary electric system, and a first closed state to electrically connect the first energy storage device to at least one of the motor-generator and the auxiliary electric system. Current from the first energy storage device is delivered to at least one of the motor-generator and the gearbox when the first switching device is in the first closed state such that the gearbox starts the engine.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
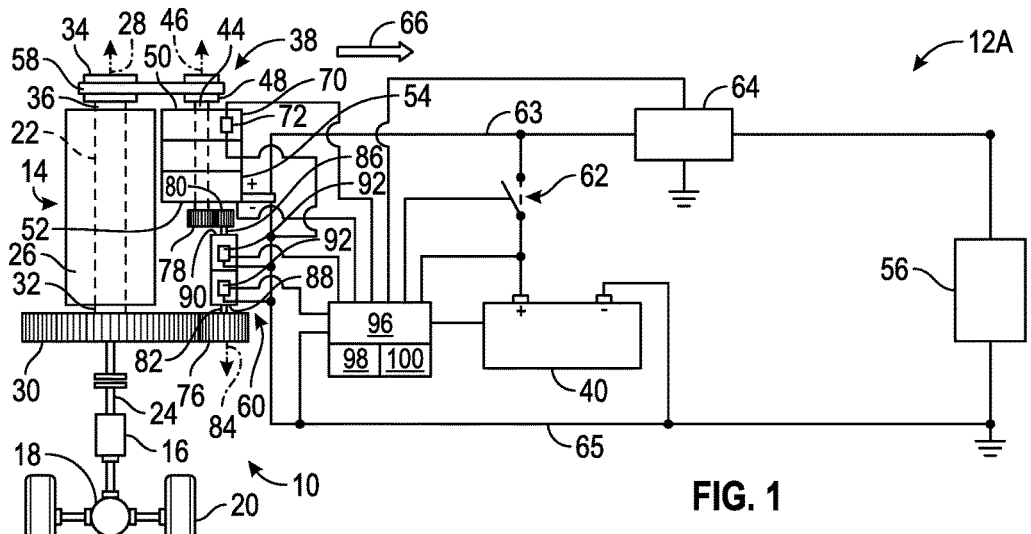
FIG. 1 is a schematic illustration of a vehicle including a powertrain of a first configuration.

Referring to the Figures, wherein like numerals indicate like or corresponding parts throughout the several views, a vehicle 10 is generally shown. A plurality of embodiments of a powertrain 12A, 12B, 12C, 12D, 12E for the vehicle 10 are generally shown. The vehicle 10 that can utilize the powertrain 12A, 12B, 12C, 12D, 12E can be an automotive vehicle, such as, a car, a truck, etc. It is to be appreciated that the vehicle 10 can alternatively be a non-automotive vehicle, such as, a farm vehicle, a marine vehicle, an aviation vehicle, etc. Furthermore, the vehicle 10 can be a hybrid vehicle utilizing the powertrain 12A, 12B, 12C, 12D, 12E disclosed herein. It is to be appreciated that the vehicle 10 can be any other suitable vehicle that can utilize the powertrain 12A, 12B, 12C, 12D, 12E disclosed herein.

Generally, as shown in the Figures, the powertrain 12A, 12B, 12C, 12D, 12E for each of the embodiments herein can include an engine 14, a transmission 16 and a final drive 18 coupleable to each other to rotate wheels 20 of the vehicle 10 to propel the vehicle 10. The engine 14 can include an output member 22 or crankshaft 22 which is coupleable to an input member 24 of the transmission 16. The transmission 16 can include a gearing arrangement and one or more clutches through which torque is transferred from the output member 22 of the engine 14 to the input member 24 of the transmission 16, then to the final drive 18 and out to the wheels 20 to move the vehicle 10. The wheels 20 can be front wheels or rear wheels of the vehicle 10. The front and/or the rear wheels 20 can be powered by the powertrain 12A, 12B, 12C, 12D, 12E.

The powertrain 12A, 12B, 12C, 12D, 12E of each of the embodiments (shown in FIGS. 1-5) includes the engine 14 as discussed above. For example, the engine 14 can be an internal combustion engine. The engine 14 can include a housing 26 and the crankshaft 22 at least partially disposed inside the housing 26. The crankshaft 22 is rotatable about a longitudinal axis 28. In the Figures, the crankshaft 22 is shown schematically without any specific features for illustrative purposes only and it is to be appreciated that the crankshaft 22 can have various configurations to cooperate with other components of the engine 14. The engine 14 can also include a cylinder block, one or more connecting rods, pistons, valves, etc., which will not be discussed further. It is to be appreciated that the engine 14 can be designed to operate on gasoline, diesel fuel, etc.

Continuing with FIGS. 1-5, the powertrain 12A, 12B, 12C, 12D, 12E of each of the embodiments can include a ring gear 30. In certain embodiments, the ring gear 30 is disposed outside of the housing 26. The ring gear 30 is attached to a first distal end 32 of the crankshaft 22 such that the ring gear 30 and the crankshaft 22 are rotatable in unison about the longitudinal axis 28. Simply stated, the ring gear 30 and the crankshaft 22 can rotate as a unit about the longitudinal axis 28.

Additionally, the powertrain 12A, 12B, 12C, 12D, 12E of each of the embodiments (see FIGS. 1-5) can include a rotatable element 34, such as a crankshaft pulley 34, which is rotatable about the longitudinal axis 28. In certain embodiments, the crankshaft pulley 34 is disposed outside of the housing 26 of the engine 14. The crankshaft pulley 34 is coupleable to a second distal end 36 of the crankshaft 22 such that the crankshaft pulley 34 and the crankshaft 22 can be rotatable in unison about the longitudinal axis 28. Specifically, coupleable can include when the crankshaft pulley 34 is directly coupled to the crankshaft 22 or indirectly coupled to the crankshaft 22 by the operation of another mechanism, such as clutching, as discussed further below. Generally, the first and second distal ends 32, 36 of the crankshaft 22 are spaced from each other along the longitudinal axis 28. It is to be appreciated that one or more bearings can rotatably support the crankshaft 22. It is to also be appreciated that the rotatable element 34 can be a sprocket, etc., instead of a pulley.

Furthermore, the powertrain 12A, 12B, 12C, 12D, 12E of each of the embodiments (see FIGS. 1-5) includes a motor-generator 38 coupleable to the engine 14. For example, the motor-generator 38 can be coupled to the outside of the housing 26 of the engine 14 and/or supported by any suitable component adjacent to the engine 14. The motor-generator 38 can be supported by any suitable methods, such as fasteners, brackets, braces, etc. The motor-generator 38 can operate as a motor or as a generator. The powertrain 12A, 12B, 12C, 12D, 12E can be referred to as a hybrid powertrain because the powertrain 12A, 12B, 12C, 12D, 12E utilizes the motor-generator 38 which can assist in reducing fuel consumption and emissions of the vehicle 10. For example, in certain embodiments, the motor-generator 38 can be utilized as a motor to start the engine 14 or as a torque assist which provides torque to the crankshaft 22 to assist in propelling the vehicle 10 when the vehicle 10 is moving (utilizing an endless rotatable device 58 discussed below). As another example, the motor-generator 38 can be utilized as a generator to generate current, i.e., electricity, or recharge a first energy storage device 40 and/or a second energy storage device 42, as discussed further below. When the motor-generator 38 is generating current/electricity, the current can drive various auxiliary devices of the vehicle 10, which is also discussed further below.

Figure 2:
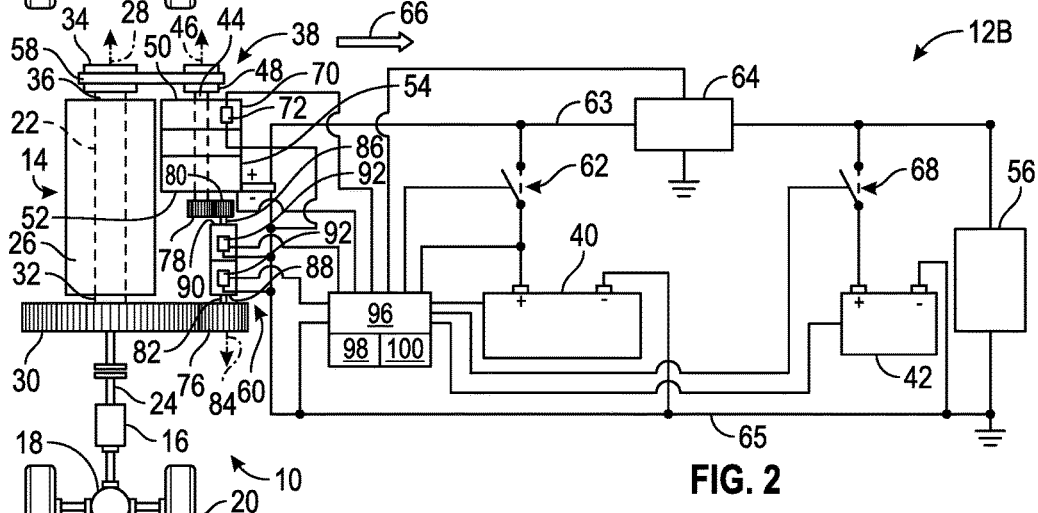
FIG. 2 is a schematic illustration of the vehicle including a powertrain of a second configuration.
Figure 5:
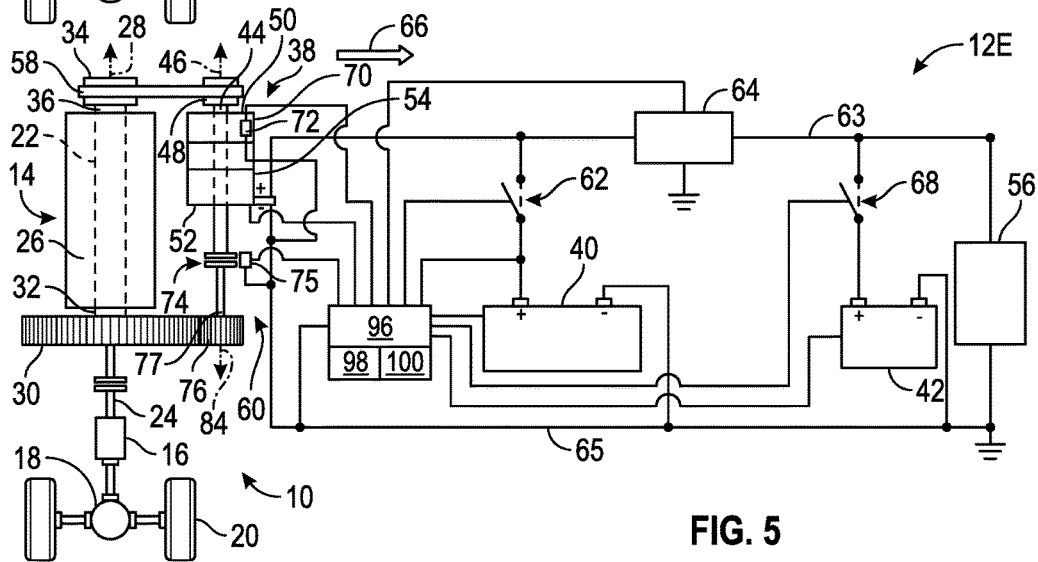
FIG. 5 is a schematic illustration of the vehicle including a powertrain of a fifth configuration.

One suitable motor-generator 38 is a brushless electric motor-generator. Additionally, the motor-generator 38 can be an alternating current (AC) motor-generator or any other suitable motor-generator. For example, at least for the powertrain 12A, 12B, 12E embodiments of FIGS. 1, 2 and 5, torque being outputted from the AC motor-generator 38 can be from about 15.0 newton meter (Nm) to about 25.0 Nm. As another example, at least for the powertrain 12A, 12B, 12E embodiments of FIGS. 1, 2 and 5, the torque being outputted from the AC motor-generator 38 can be from about 15.0 Nm to about 20.0 Nm. The motor-generator 38, for the embodiments of FIGS. 1, 2 and 5, provides reduced maximum torque requirement, (as compared, for example, to a BAS as discussed in the background section), which allows the mass size of the motor-generator 38 to be decreased and also allows reduced power requirements of the motor-generator 38. It is to be appreciated that the torque being outputted from the motor-generator 38 can be values other than identified above. For example, for the powertrain 12C, 12D embodiments of FIGS. 3 and 4, the torque being outputted from the AC motor-generator 38 can be greater than 25.0 Nm.

As shown in the Figures, the motor-generator 38 can include a motor/generator shaft 44 that can be rotatable about a first axis 46. In certain operations, when the motor/generator shaft 44 rotates, torque can be transferred to the crankshaft 24 as discussed further below. Furthermore, the motor/generator shaft 44 does not move along the first axis 46. Additionally, the first axis 46 is spaced from the longitudinal axis 28. In certain embodiments, the first axis 46 and the longitudinal axis 28 are spaced from each other and substantially parallel to each other. Therefore, the motor/generator shaft 44 and the crankshaft 22 are offset from each other. It is to be appreciated that the motor/generator shaft 44 can be split into more than one piece, e.g., more than one piece to accommodate the operation of one or more clutches, etc.

Continuing with FIGS. 1-5, the motor-generator 38 can include a rotatable element 48, such as a motor/generator pulley 48, being coupleable to the motor/generator shaft 44 adjacent to a first end 50 of the motor-generator 38. Specifically, the motor/generator pulley 48 can be disposed outside of the first end 50 of the motor-generator 38. The motor/generator pulley 48 can also be rotatable about the first axis 46. For certain operations, the motor/generator shaft 44 and the motor/generator pulley 48 can rotate in unison about the first axis 46. In other operations, the motor/generator shaft 44 and the motor/generator pulley 48 are not rotatable in unison, i.e., rotatable separately or one rotatable while the other remains stationary (does not rotate). Coupleable can include when the motor/generator pulley 48 is directly coupled to the motor/generator shaft 44 or indirectly coupled to the motor/generator shaft 44 by the operation of another mechanism, such as clutching, as discussed further below.

In certain embodiments, the motor/generator shaft 44 can extend out of a second end 52 of the motor-generator 38. Generally, the first and second ends 50, 52 of the motor-generator 38 are spaced from each other along the first axis 46. Specifically, the motor-generator 38 can include a housing having the first and second ends 50, 52. Therefore, the motor/generator shaft 44 is at least partially disposed inside the housing of the motor-generator 38. It is to be appreciated that one or more bearings can rotatably support the motor/generator shaft 44. It is to also be appreciated that the rotatable element 48 can be a sprocket, etc., instead of a pulley.

The motor-generator 38 of each of these powertrain 12A, 12B, 12C, 12D, 12E embodiments can include a stator and a rotor spaced from the stator. The rotor is attached to the motor/generator shaft 44 such that the rotor and the motor/generator shaft 44 are rotatable in unison about the first axis 46 relative to the stator. Simply stated, the rotor and the motor/generator shaft 44 are rotatable as a unit about the first axis 46 while the stator remains stationary. The stator is in electrical communication with the first and/or second energy storage devices 40, 42. For example, when the motor-generator 38 is functioning as the motor, current stored in the first and/or second energy storage devices 40, 42 can be supplied to the stator/rotor to cause rotation of the rotor and ultimately start the engine 14 for the embodiments of FIGS. 1, 2 and 5, and in certain situations, can start the engine 14 for the embodiments of FIGS. 3 and 4. As another example, for all of the embodiments herein, when the motor-generator 38 is functioning as the generator, torque from the rotor rotating about the first axis 46 is converted into electrical current which can be stored in the first and/or second energy storage devices 40, 42 for later use.

The motor-generator 38 can operate in various modes to perform various functions. For example, the motor-generator 38 can operate in a generating mode to generate current by rotating the rotor of the motor-generator 38 relative to the stator of the motor-generator 38. Simply stated, the motor-generator 38 can operate as a generator when in the generating mode. The generating mode can occur when the vehicle 10 is motoring at a certain speed and is not braking/slowing down the vehicle 10. As another example, the motor-generator 38 can operate in a torque assist mode to provide torque to the wheels 20 of the vehicle 10 (utilizing an endless rotatable device 58 discussed below). Simply stated, the motor-generator 38 can operate as a motor when in the torque assist mode. As yet another example, the motor-generator 38 can operate in a regenerative braking mode to generate current during braking, i.e., slowing down, of the vehicle 10 by rotating the rotor of the motor-generator 38 relative to the stator of the motor-generator 38. Simply stated, the motor-generator 38 can operate as a generator when in the regenerative braking mode.

Referring to FIGS. 1-5, the motor-generator 38 of each of these embodiments can also include an electrical device that can include an integrated power inverter 54. The stator can be in electrical communication with the integrated power inverter 54, and the integrated power inverter 54 can be selectively in electrical communication with the first and/or second energy storage devices 40, 42. The integrated power inverter 54 can convert direct current (DC) provided by the first and/or second energy storage devices 40, 42 to alternating current (AC) to power the motor-generator 38 to function as the motor. Furthermore, the integrated power inverter 54 can convert AC to DC to be stored in the first and/or second energy storage devices 40, 42 when the motor-generator 38 functions as the generator. Additionally, the integrated power inverter 54 can convert AC to DC to supply current to an auxiliary electric system 56. Also, the integrated power inverter 54 can convert AC to DC to selectively supply current to the first and/or second energy storage devices 40, 42. Generally, the integrated power inverter 54 can be in electrical communication with the stator to operate the motor-generator 38 as the motor or as the generator. The motor-generator 38 can include other electrical devices, such as one or more sensors (such as for example, a motor position sensor that detects the position of the motor/generator shaft 44), controllers, fans to cool electrical components, etc. Furthermore, the integrated power inverter can include one or more brushes, one or more brush holders, a field control electronic device when using a wound field machine, etc.

Continuing with FIGS. 1-5, each of the embodiments of the powertrain 12A, 12B, 12C, 12D, 12E can further include an endless rotatable device 58, i.e., a device having no ends, disposed about the crankshaft pulley 34 and the motor/generator pulley 48. Specifically, the endless rotatable device 58 is disposed about the crankshaft pulley 34 and the motor/generator pulley 48 to transfer rotational movement between the crankshaft pulley 34 and the motor/generator pulley 48. In other words, the endless rotatable device 58 is disposed about the crankshaft pulley 34 and the motor/generator pulley 48 to selectively transfer torque between the crankshaft 22 and the motor/generator shaft 44. For example, in certain operations, rotation of the motor/generator pulley 48 by the endless rotatable device 58 can correspondingly rotate the motor/generator shaft 44, etc.

In certain embodiments, the endless rotatable device 58 is a belt. The belt can be a ribbed belt, a flat belt or any other suitable configuration. The motor-generator 38 can be coupled to the engine 14 by the endless rotatable device 58. Specifically, the motor-generator 38 can be coupled to the crankshaft 22 of the engine 14 by the endless rotatable device 58 and the pulleys 34, 48. In certain embodiments, the endless rotatable device 58 can be a chain instead of the belt and sprockets can be utilized with the chain instead of the pulleys 34, 48.

Figure 3:
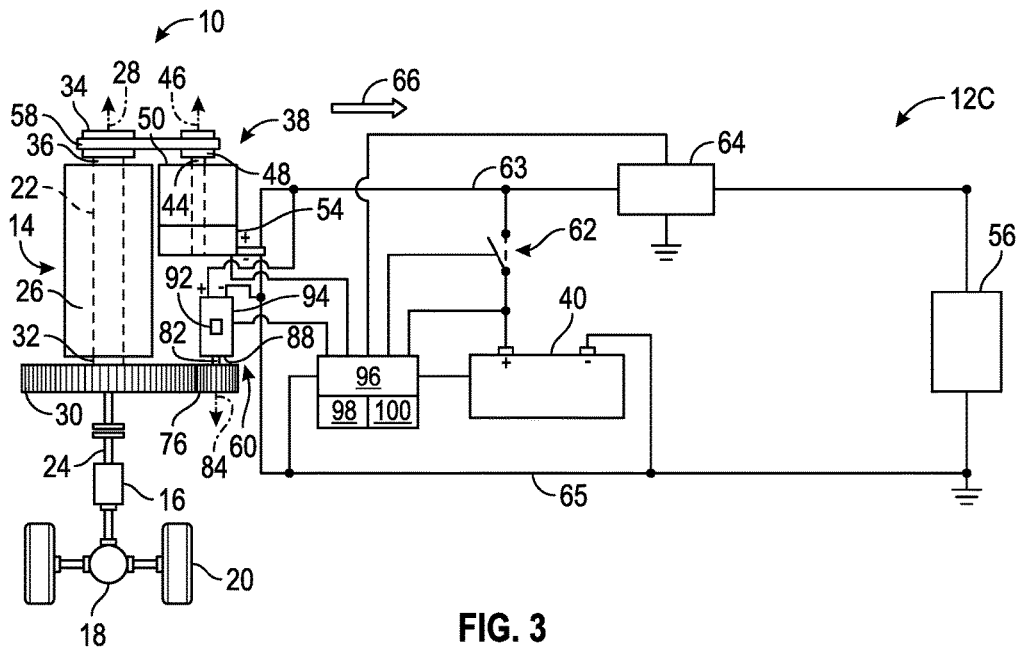
FIG. 3 is a schematic illustration of the vehicle including a powertrain of a third configuration.
Figure 4:
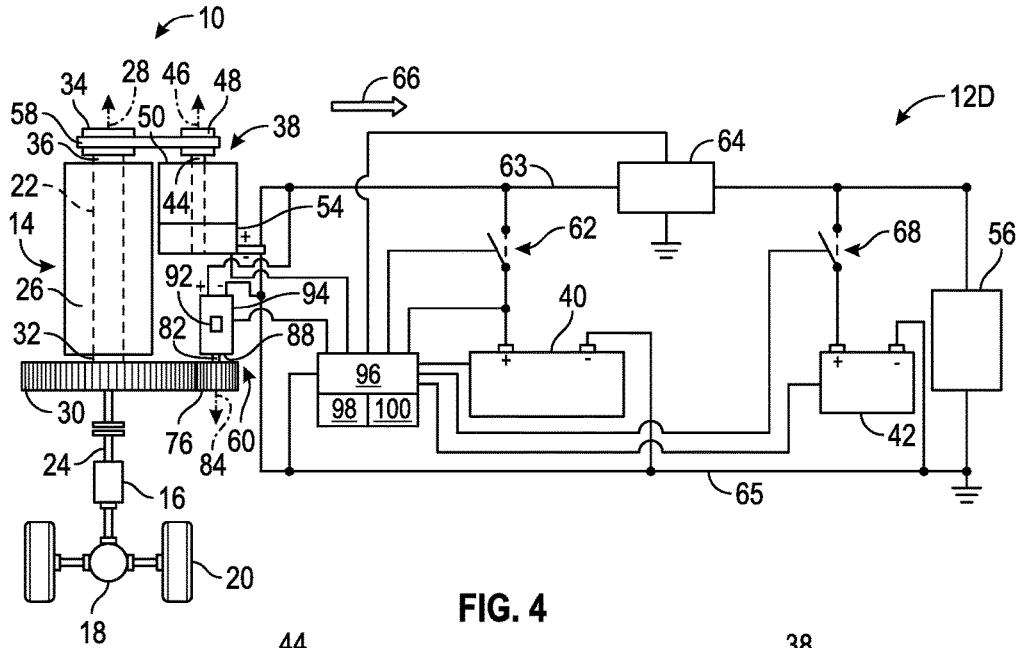
FIG. 4 is a schematic illustration of the vehicle including a powertrain of a fourth configuration.
Figure 6:
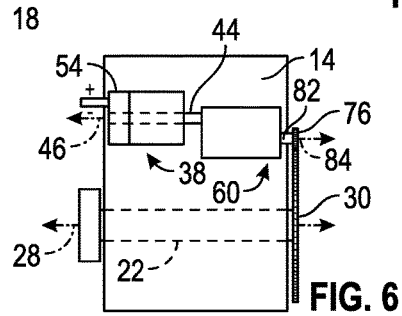
FIG. 6 is a schematic illustration of another configuration of a motor-generator and a starter mechanism.
Figure 7:
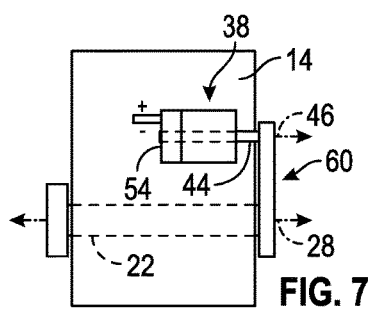
FIG. 7 is a schematic illustration of yet another configuration of the motor-generator and the starter mechanism.

Referring to the Figures, the powertrain 12A, 12B, 12C, 12D, 12E of each of the embodiments also includes a starter mechanism 60 coupleable to the engine 14. The starter mechanism 60 can be various configurations. The starter mechanism 60 can be in one configuration as shown in FIGS. 1 and 2. Alternatively, the starter mechanism 60 can be in another configuration as shown in FIGS. 3 and 4. Yet another alternative, the starter mechanism 60 can be in another configuration as shown in FIG. 5. Furthermore, the starter mechanism 60 can be in yet other configurations as shown in FIGS. 6 and 7. The starter mechanism 60 for each of the embodiments can include a first starter gear 76 and each of the configurations of the starter mechanism 60 are discussed in detail below. The starter mechanism 60 is coupleable to the engine 14 through engagement of the first starter gear 76 with the ring gear 30 as also discussed below. Furthermore, the motor-generator 38 can be coupleable to the engine 14 through the starter mechanism 60.

Furthermore, the powertrain 12A, 12B, 12C, 12D, 12E of each of the embodiments can include the auxiliary electric system 56 in electrical communication with the motor-generator 38. The auxiliary electric system 56 can include one or more accessory devices of the vehicle 10. For example, the auxiliary electric system 56 can include headlights, HVAC devices, auxiliary motors, entertainment system components, etc. In certain embodiments, the integrated power inverter 54 is in electrical communication with the auxiliary electric system 56 to convert AC produced by the motor-generator 38 to DC. Therefore, the DC can be utilized by the auxiliary electric system 56 to power various accessories.

Continuing with FIGS. 1-5, the powertrain 12A, 12B, 12C, 12D, 12E of each of the embodiments include the first energy storage device 40, which is disposed in a parallel electrical relationship with the motor-generator 38 and the auxiliary electric system 56. In other words, the first energy storage device 40 is disposed in a parallel circuit arrangement with the motor-generator 38 and the auxiliary electric system 56. The first energy storage device 40 can be any suitable battery or other device that can store current for later use.

The powertrain 12A, 12B, 12C, 12D, 12E of each of the embodiments also include a first switching device 62 selectively transitionable between a first open state to electrically disconnect the first energy storage device 40 from at least one of the motor-generator 38 and the auxiliary electric system 56, and a first closed state to electrically connect the first energy storage device 40 to at least one of the motor-generator 38 and the auxiliary electric system 56. Therefore, electrical communication between the motor-generator 38 and the auxiliary electric system 56 is independent of the first switching device 62 being in the first open and closed states. Therefore, the location of the first switching device 62 does not interfere with the electrical communication between the motor-generator 38 and the auxiliary electric system 56. In other words, the motor-generator 38 and the auxiliary electric system 56 can be in electrical communication with each other independently of which state the first switching device 62 is in. The first energy storage device 40 is disposed between an electrical bus 63 and an electrical ground 65, and the first switching device 62 is disposed between the first energy storage device 40 and the electrical bus 63 such that the first energy storage device 40 is in direct electrical communication with the electrical bus 63 when the first switching device 62 is in the first closed state. The electrical bus 63 can be a high-voltage DC bus and/or a low-voltage DC bus.

The phrase "at least one of" as used herein should be construed to include the non-exclusive logical "or", i.e., at least one of the motor-generator 38 or the auxiliary electric system 56. Therefore, in certain embodiments, the first energy storage device 40 is in electrical communication with the motor-generator 38 or the auxiliary electric system 56. In other embodiments, the first energy storage device 40 is in electrical communication with both of the motor-generator 38 and the auxiliary electric system 56.

In general, for embodiments 1-5, the first switching device 62 is used to selectively block the flow of current to the first energy storage device 40. When the first switching device 62 is in the first closed state, the electrical circuit to the first energy storage device 40 is completed or closed and current can flow to or from the first energy storage device 40. When the first switching device 62 is in the first open state, the electrical circuit is separated or open and current cannot flow to or from the first energy storage device 40. The first open state is shown in solid lines in the Figures and the first closed state is shown as dashed lines in the Figures.

The first switching device 62 for all of these embodiments can be a unidirectional blocking switch or a bidirectional blocking switch. In one configuration, the first switching device 62 is a solid-state switch. The first switching device 62 can be a binary switch, a contact switch, a relay switch, etc. The first switching device 62 is schematically illustrated in the Figures for illustrative purposes only and should not be construed as any particular type of switch.

Optionally, the powertrain 12A, 12B, 12C, 12D, 12E of each of the embodiments can include an electrical component 64 disposed downstream to the motor-generator 38 and the first energy storage device 40 along the electrical bus 63. Furthermore, in these embodiments, the electrical component 64 is disposed upstream to the auxiliary electric system 56 along the electrical bus 63. Downstream as used herein is the direction flowing from the motor-generator 38 toward the auxiliary electric system 56 along the electrical bus 63 and the arrow 66 in each of the Figures point in the downstream direction. Generally, when utilizing the electrical component 64, the electrical component 64 is disposed in a series electrical relationship, i.e., a series circuit arrangement, with the motor-generator 38 and the auxiliary electric system 56.

In certain embodiments, the electrical component 64 can include a DC-DC converter. In other embodiments, the electrical component 64 can include one of the DC-DC converter and a third switching device. Specifically, the DC-DC converter can be utilized in any of the embodiments discussed herein, while the third switching device can be utilized in the two energy storage device 40, 42 embodiments. Therefore, the DC-DC converter can be utilized in the electrical circuitry of FIGS. 1-5 and the third switching device can be utilized in the electrical circuitry of FIGS. 2, 4 and 5. The third switching device can be a unidirectional blocking switch or a bidirectional blocking switch. In one configuration, the third switching device is a solid-state switch. The third switching device can be a binary switch, a contact switch, a relay switch, etc. Therefore, the electrical component 64 can allow continuous or selective electrical communication between the motor-generator 38 and the auxiliary electric system 56.

Turning to the DC-DC converter, the DC-DC converter regulates an amount of voltage delivered to the auxiliary electric system 56. Therefore, the DC-DC converter can be utilized to ensure that the desired amount of current, within a predetermined voltage range, is delivered to the auxiliary electric system 56 to power various accessories which can include powering all or some of the accessories of the vehicle 10. In other words, the DC-DC converter can be utilized to provide substantially constant voltage to the auxiliary electric system 56 if the voltage level of the first and/or second energy storage devices 40, 42 deviate a predetermined amount of voltage from about a 12 volt bus. For example, if the voltage level deviates to below about 10 volts or above about 16 volts, the DC-DC converter can regulate the voltage being delivered to the auxiliary electric system 56. Therefore, the DC-DC converter can increase or decrease the voltage being delivered to the auxiliary electric system 56. As another example, when the voltage remains above about 16 volts, the DC-DC converter can regulate down the voltage being delivered to all of the accessories of the auxiliary electric system 56. As indicated above, the DC-DC converter is optional in the embodiments where the voltage being delivered to the auxiliary electric system 56 is within the range useable by the auxiliary electric system 56, i.e., the voltage being delivered to the auxiliary electric system 56 does not need changing.

The powertrain 12A, 12C for the embodiments of FIGS. 1 and 3 utilize one energy storage device 40 and one switching device 62, while the powertrain 12B, 12D, 12E for the embodiments of FIGS. 2, 4 and 5 utilize two energy storage devices 40, 42 and two switching devices 62, 68. Furthermore, as mentioned above, the starter mechanism 60 can have different configurations. Specifically, FIGS. 1 and 2 utilize the same starter mechanism 60, while FIGS. 3 and 4 utilize the starter mechanism 60 being different from FIGS. 1 and 2. Additionally, FIG. 5 utilizing a different starter mechanism 60 from FIGS. 1-4.

The powertrain 12B, 12D, 12E for the embodiments of FIGS. 2, 4 and 5, can further include the second energy storage device 42 disposed in a parallel electrical relationship with the first energy storage device 40, the motor-generator 38 and the auxiliary electric system 56. In other words, the second energy storage device 42 is disposed in a parallel circuit arrangement with the motor-generator 38 and the auxiliary electric system 56.

As indicated above, these embodiments (FIGS. 2, 4 and 5) of the powertrain 12B, 12D, 12E utilizes two energy storage devices 40, 42. Generally, for these embodiments, the first energy storage device 40 is a high-voltage energy storage device, and the second energy storage device 42 is a low-voltage energy storage device that is in electrical communication with the auxiliary electric system 56. The first energy storage device 40 is utilized to selectively supply current/voltage to the motor-generator 38 and the second energy storage device 42 is utilized to selectively supply current/voltage to the auxiliary electric system 56. The high-voltage energy storage device and the low-voltage energy storage device can be separate energy storage devices 40, 42 as shown in FIGS. 2, 4 and 5. The first and second energy storage devices 40, 42 can be any suitable battery or other device that can store current for later use. One non-limiting example is that the high-voltage energy storage device can be a 48 volt DC battery and the low-voltage energy storage device can be a 12 volt DC battery. Another non-limiting example is the high-voltage energy storage device can be a 24-48 volt DC multi-cell rechargeable lithium ion battery or an ultracapacitor, while the low-voltage energy storage device can be a 12 volt DC lead acid or lithium ion battery. As yet another example, the first and second energy storage devices 40, 42 can have substantially the same voltage levels.

Furthermore, the powertrain 12B, 12D, 12E for the embodiments of FIGS. 2, 4 and 5 can include a second switching device 68 selectively transitionable between a second open state to electrically disconnect the second energy storage device 42 from at least one of the motor-generator 38 and the auxiliary electric system 56, and a second closed state to electrically connect the second energy storage device 42 to at least one of the motor-generator 38 and the auxiliary electric system 56. Electrical communication between the motor-generator 38 and the auxiliary electric system 56 is independent of the second switching device 68 being in the second open and closed states. Therefore, the location of the second switching device 68 does not interfere with the electrical communication between the motor-generator 38 and the auxiliary electric system 56. In other words, the motor-generator 38 and the auxiliary electric system 56 can be in electrical communication with each other independently of which state the second switching device 68 is in. The second energy storage device 42 is disposed between the electrical bus 63 and the electrical ground 65, and the second switching device 68 is disposed between the second energy storage device 42 and the electrical bus 63 such that the second energy storage device 42 is in direct electrical communication with the electrical bus 63 when the second switching device 68 is in the second closed state. Therefore, due to the location of the first and second switching devices 62, 68, current can selectively flow to/from the first and second energy storage devices 40, 42 independently of each other.

As discussed above, the phrase "at least one of should be construed to include the non-exclusive logical "or", i.e., at least one of the motor-generator 38 or the auxiliary electric system 56. Therefore, in certain embodiments, the second energy storage device 42 is in electrical communication with the motor-generator 38 or the auxiliary electric system 56. In other embodiments, the second energy storage device 42 is in electrical communication with both of the motor-generator 38 and the auxiliary electric system 56.

Generally, for the embodiments of FIGS. 2, 4 and 5, the second switching device 68 is used to selectively block the flow of current to the second energy storage device 42. When the second switching device 68 is in the second closed state, the electrical circuit to the second energy storage device 42 is completed or closed and current can flow to or from the second energy storage device 42. When the second switching device 68 is in the second open state, the electrical circuit is separated or open and current cannot flow to or from the second energy storage device 42. The second open state is shown in solid lines in FIGS. 2, 4 and 5 and the second closed state is shown as dashed lines in FIGS. 2, 4 and 5.

The second switching device 68 for FIGS. 2, 4 and 5 can be a unidirectional blocking switch or a bidirectional blocking switch. In one configuration, the second switching device 68 is a solid-state switch. The second switching device 68 can be a binary switch, a contact switch, a relay switch, etc. The second switching device 68 is schematically illustrated in these Figures for illustrative purposes only and should not be construed as any particular switch.

Additionally, when the embodiments with two energy storage devices 40, 42 utilize the electrical component 64, the electrical component 64 is disposed upstream to the second energy storage device 42 and the auxiliary electric system 56 along the electrical bus 63. When the electrical component 64 includes the DC-DC converter, the DC-DC converter can be utilized when the first energy storage device 40 is generally a higher voltage device than the second energy storage device 42. Again, the DC-DC converter regulates the amount of voltage delivered to the auxiliary electric system 56. When utilizing the DC-DC converter, the DC-DC converter can be in an off state, i.e., not operating to regulate voltage, in certain situations such that the second energy storage device 42 (when the second switching device 68 is in the second closed state) can provide current to the auxiliary electric system 56 while the first energy storage device 40 (when the first switching device 62 is in the first closed state) can provide current to the motor-generator 38 or the motor 94 of the starter mechanism 60 to start the engine 14 or perform other operating modes. For example, in the two energy storage device 40, 42 embodiments, the electrical component 64 can be eliminated if the voltage levels of the first and second energy storage devices 40, 42 are substantially the same or the DC-DC converter can be replaced by the third switching device in the two energy storage device 40, 42 embodiments. As another example, when the voltage levels of the first and second energy storage device 40, 42 are substantially the same, the DC-DC converter can be replaced by the third switching device.

In the embodiments of FIGS. 1, 2 and 5, the motor-generator 38 can include a motor/generator clutch 70 selectively disconnecting rotation between the motor/generator pulley 48 and the motor/generator shaft 44. The motor/generator pulley 48 is coupleable to the motor/generator shaft 44 through the selective operation of the motor/generator clutch 70. Therefore, the motor/generator pulley 48 is selectively coupled to the motor/generator shaft 44 through the operation of the motor/generator clutch 70. The motor/generator clutch 70 can be disposed adjacent to the motor/generator pulley 48 or adjacent to the first end 50 of the motor-generator 38. Actuation of the motor/generator clutch 70 allows various operations of the motor-generator 38 without transferring rotation between the crankshaft pulley 34 and the motor/generator pulley 48 by the endless rotatable device 58. The motor/generator clutch 70 can include a solenoid 72 to selectively actuate the motor/generator clutch 70. It is to be appreciated that the motor/generator clutch 70 can be any suitable type of clutch.

Turning specifically to the powertrain 12E embodiment of FIG. 5, the starter mechanism 60 is further defined as a starter clutch 74. In this embodiment, the motor/generator clutch 70 can be disposed between the motor/generator pulley 48 and the starter clutch 74 to selectively disconnect rotation between the motor/generator pulley 48 and the motor/generator shaft 44. The starter clutch 74 can include a solenoid 75 to selectively actuate the starter clutch 74. It is to be appreciated that the starter clutch 74 can be a one-way clutch, a hydraulic clutch, an electromechanical clutch or any other suitable type of clutch. The starter clutch 74 can be utilized in a one energy storage device 40 embodiment or a two energy storage device 40, 42 embodiment.

Furthermore, in this embodiment (FIG. 5), the starter mechanism 60 can include the first starter gear 76 coupleable to the starter clutch 74. The first starter gear 76 is coupleable to the starter clutch 74 through the selective operation of the starter clutch 74. The first starter gear 76 continuously engages the ring gear 30 to rotate the ring gear 30 and the crankshaft 22 when starting the engine 14. The first starter gear 76 can be attached to a shaft 77 such that the first starter gear 76 and the shaft 77 can rotate in unison. The starter clutch 74 is disposed between the motor-generator 38 and the first starter gear 76 to selectively disconnect rotation between the first starter gear 76 and the motor-generator 38. The starter clutch 74 is disposed between the motor-generator 38 and the first starter gear 76 to selectively transfer torque from the motor-generator 38 through the first starter gear 76 and the ring gear 30 to the crankshaft 22. For example, the starter clutch 74 can be disposed adjacent to the second end 52 of the motor-generator 38. Therefore, the motor/generator pulley 48 is disposed adjacent to one end of the motor-generator 38 and the starter clutch 74 is disposed adjacent to another end of the motor-generator 38. Specifically, the starter clutch 74 can be disposed between the motor/generator shaft 44 and the shaft 77. The starter clutch 74 is coupleable to the motor/generator shaft 44 to selectively transfer torque from the motor/generator shaft 44 through the first starter gear 76 and the ring gear 30 to the crankshaft 22. Therefore, the motor/generator shaft 44 and the first starter gear 76 are selectively coupled to each other through the operation of the starter clutch 74.

Actuation of the starter clutch 74 connects rotation of the motor/generator shaft 44 with the first starter gear 76, which in turn rotates the ring gear 30 to turn the crankshaft 22 to start the engine 14. As such, torque is transferred from the rotating motor/generator shaft 44 through the first starter gear 76 and the ring gear 30 to the crankshaft 22 to start the engine 14. Once the engine 14 is started, the starter clutch 74 disconnects rotation of the motor/generator shaft 44 and the first starter gear 76 such that the motor/generator shaft 44 can operate independently of the first starter gear 76. In this embodiment, the starter clutch 74 does not include a separate motor to rotate the first starter gear 76 to start the engine 14. Instead, rotation of the first starter gear 76 is provided by the motor-generator 38 when the starter clutch 74 is actuated. In other words, the motor-generator 38 can be operated as a motor to turn the first starter gear 76 when the starter clutch 74 is actuated to start the engine 14. Therefore, for all starts of the engine 14 (for the embodiment of FIG. 5), whether a short period of time (such as when the engine 14 has been shut off at a stop light, etc.) or an extended period of time (such as when the engine 14 has been shut off overnight, etc.), the motor-generator 38 operates to rotate the first starter gear 76 to start the engine 14.

Turning to the powertrain 12A, 12B for the embodiments of FIGS. 1 and 2, the motor-generator 38 and the starter mechanism 60 are selectively geared to each other to start the engine 14. Specifically, the motor-generator 38 and the starter mechanism 60 are selectively geared to each other to transfer torque from the motor-generator 38 through the starter mechanism 60 to the crankshaft 22 to start the engine 14. The motor-generator 38 and the starter mechanism 60 can be geared to each other in various configurations, and FIGS. 1 and 2 are examples of one suitable configuration. In these embodiments, the starter mechanism 60 can include the first starter gear 76 selectively engaging the ring gear 30 to selectively rotate the ring gear 30 and the crankshaft 22 to start the engine 14. Specifically, the starter mechanism 60 does not include a separate motor to rotate the first starter gear 76. Instead, rotation of the first starter gear 76 is provided by the motor-generator 38 to start the engine 14. In other words, the motor-generator 38 can be operated as a motor to turn the first starter gear 76 to start the engine 14. Therefore, for all starts of the engine 14 (for the embodiments of FIGS. 1 and 2), whether a short period of time (such as when the engine 14 has been shut off at a stop light, etc.) or an extended period of time (such as when the engine 14 has been shut off overnight, etc.), the motor-generator 38 operates to rotate the first starter gear 76 to start the engine 14.

Continuing with the embodiments of FIGS. 1 and 2, the motor-generator 38 can include a motor/generator gear 78 attached to a distal end of the motor/generator shaft 44 such that the motor/generator gear 78 and the motor/generator shaft 44 are rotatable in unison about the first axis 46. Generally, the motor/generator gear 78 can be disposed outside of the second end 52 of the motor-generator 38. As discussed above, the motor/generator pulley 48 can be disposed outside of the first end 50 of the motor-generator 38. Therefore, the motor/generator pulley 48 is disposed adjacent to one end of the motor-generator 38 and the motor/generator gear 78 is disposed adjacent to another end of the motor-generator 38. For example, the motor/generator pulley 48 and the motor/generator gear 78 can be spaced from each other at opposite ends of the motor-generator 38.

Furthermore, in the embodiments of FIGS. 1 and 2, the starter mechanism 60 can include a second starter gear 80 coupleable to the motor/generator gear 78 such that the starter mechanism 60 and the motor-generator 38 are selectively geared to each other to transfer torque from the motor/generator shaft 44 through the first starter gear 76. The second starter gear 80 can move back and forth to selectively engage the motor/generator gear 78 to selectively transfer rotation from the motor/generator shaft 44 to the starter mechanism 60. Similarly, the first starter gear 76 can move back and forth to selectively engage the ring gear 30 to selectively transfer rotation from the motor/generator shaft 44 to the first starter gear 76.

Additionally, the starter mechanism 60, of FIGS. 1 and 2, can include a first shaft 82 having the first starter gear 76 attached thereto. In this embodiment, the first shaft 82 and the first starter gear 76 are rotatable in unison about a second axis 84. Generally, the first and second axes 46, 84 can be spaced and substantially parallel to each other. In addition, in this embodiment, the first shaft 82 and the first starter gear 76 move along the second axis 84 in unison. In other words, the first shaft 82 and the first starter gear 76 are rotatable about and movable along the second axis 84 as a unit. In this embodiment, the motor/generator shaft 44 and the first shaft 82 are offset from each other. It is to be appreciated that one or more bearings can rotatably support the first shaft 82.

Continuing with the embodiments of FIGS. 1 and 2, the starter mechanism 60 can also include a second shaft 86 having the second starter gear 80 attached thereto. In this embodiment, the second shaft 86 and the second starter gear 80 are rotatable in unison about the second axis 84. Additionally, in this embodiment, the second shaft 86 and the second starter gear 80 are movable along the second axis 84 in unison. In other words, the second shaft 86 and the second starter gear 80 can rotate about and move along the second axis 84 as a unit. The first and second starter gears 76, 80 can move along the second axis 84 in opposite directions, and thus, the first and second shafts 82, 86 can correspondingly move in opposite directions.

The first shaft 82 extends outwardly from a first end 88 of the starter mechanism 60 and the second shaft 86 extends outwardly from a second end 90 of the starter mechanism 60. Specifically, the starter mechanism 60 can include a housing having the first and second ends 88, 90. Therefore, the first starter gear 76 can be disposed outside the first end 88 of the starter mechanism 60 and the second starter gear 80 can be disposed outside the second end 90 of the starter mechanism 60. Simply stated, the first starter gear 76 is disposed adjacent to one end of the starter mechanism 60 and the second starter gear 80 is disposed adjacent to another end of the starter mechanism 60. For example, the first and second starter gears 76, 80 can be spaced from each other at opposite ends of the starter mechanism 60.

When the motor-generator 38 is actuated to start the engine 14, the first and second starter gears 76, 80 move into engagement with the ring gear 30 and the motor/generator gear 78 respectively, which thus provides concurrent rotation of the first and second shafts 82, 86, the first and second starter gears 76, 80, the motor/generator shaft 44 and the motor/generator gear 78 to rotate the ring gear 30 and the crankshaft 22 to start the engine 14. When the first starter gear 76 engages the ring gear 30 and the second starter gear 80 engages the motor/generator gear 78 torque is transferred from the motor/generator shaft 44 through the first and second starter gears 76, 80, and corresponding shafts 82, 86, and the ring gear 30 to the crankshaft 22 to start the engine 14. In this embodiment, the motor/generator shaft 44 and the second shaft 86 are offset from each other, while the first and second shafts 82, 86 are spaced from each other along the second axis 84. In other words, the first and second shafts 82, 86 can be concentric along the second axis 84.

The starter mechanism 60 can also include an intermediate shaft coupled to the first and second shafts 82, 86 between the first and second starter gears 76, 80 such that the intermediate shaft can rotatably couple the first and second shafts 82, 86 together. In other words, the first and second shafts 82, 86 remain in engagement with the intermediate shaft when the first and second shafts 82, 86 move back and forth along the second axis 84. The intermediate shaft can be any suitable configuration to allow the first and second shafts 82, 86 to move along the second axis 84 while also rotatably coupling the first and second shafts 82, 86 together. For example, the first and second shafts 82, 86 can move along the second axis 84 inside the intermediate shaft, and the intermediate shaft and the first and second shafts 82, 86 can be splined or be any other suitable configuration to cooperate with each other. It is to be appreciated that one or more bearings can rotatably support the second shaft 86 and/or the intermediate shaft. The first starter gear 76 can be coupleable to the motor/generator shaft 44 through engagement of various shafts and/or selective engagement of gears discussed above.

In certain embodiments, the first and second starter gears 76, 80 can move in tandem. Therefore, for example, the first starter gear 76 can move into engagement with the ring gear 30 before the second starter gear 80 moves into engagement with the motor/generator gear 78, and alternatively, the second starter gear 80 can move into engagement with the motor/generator gear 78 before the first starter gear 76 moves into engagement with the ring gear 30. In other embodiments, the first and second starter gears 76, 80 can move simultaneously into engagement with the ring gear 30 and the motor/generator gear 78 respectively.

Continuing with FIGS. 1 and 2, the starter mechanism 60 can also include at least one linear actuator 92. For the embodiments of FIGS. 1 and 2, a plurality of linear actuators 92 can be utilized. The linear actuator 92 can be selectively energized to move the first starter gear 76 along the second axis 84. The linear actuator 92 can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 76 to move along the second axis 84. For the electro-active polymer actuator, selectively energizing the material, such as the polymer, can change the shape of the material to move the first starter gear 76 along the second axis 84.

The operation of the linear actuator 92 is detailed below utilizing the solenoid example. Generally, the solenoid can be utilized to move the first starter gear 76 along the second axis 84. The solenoid can be disposed inside, outside or partially outside of the starter mechanism 60, or can be in any other suitable location. For FIGS. 1 and 2, one solenoid can be utilized to selectively move the first shaft 82 and the first starter gear 76, and another solenoid can be utilized to selectively move the second shaft 86 and the second starter gear 80.

The solenoid can include a coil selectively magnetized and a core attracted to the coil when the coil is magnetized. When the core is coupled to the first starter gear 76, the core is selectively attracted to the coil. When the core is attracted to the coil, the first starter gear 76 can move into engagement with the ring gear 30. Therefore, the coil remains stationary while the core is selectively movable. It is to be appreciated that the solenoid can be other configurations than discussed above. For example, the coil can be concentric or eccentric about the second axis 84, or the coil can be disposed at one side. The core can be formed of a ferromagnetic material or any other suitable material that can be attracted to the coil when the coil is magnetized.

Furthermore, for the solenoid configuration of the linear actuator 92, the starter mechanism 60 can include at least one return mechanism to move the first starter gear 76 back along the second axis 84. For example, when the solenoid is energized, the first starter gear 76 can move to engage the ring gear 30, and when the solenoid is de-energized, the return mechanism can move the first starter gear 76 out of engagement with the ring gear 30.

The return mechanism can include a biasing member to bias the first starter gear 76 back along the second axis 84. The biasing member can be a coil spring or any other suitable biasing member to move the first starter gear 76. It is to be appreciated that one or more shoulders can be coupled to the first starter gear 76 and the inside of the starter mechanism 60 to provide reaction surfaces for the biasing member to move the first starter gear 76 back along the second axis 84. It is to also be appreciated that the return mechanism can alternatively be electronically actuated.

Another suitable configuration of the starter mechanism 60 can be a single shaft having the first starter gear 76 attached to one end and the second starter gear 80 attached to another end. In other words, the two separate shafts 82, 86 (as discussed above) are eliminated and a single shaft is utilized, and in this configuration, one linear actuator 92 can be utilized. In another suitable configuration of the starter mechanism 60, the second starter gear 80 can remain in engagement with the motor/generator gear 78 while only the first starter gear 76 is able to move back and forth along the second axis 84; and in this embodiment, one linear actuator 92 can be utilized. Yet another suitable configuration of the starter mechanism 60 is the second starter gear 80 is eliminated and only the first starter gear 76 is utilized, with the first starter gear 76 movable to engage and disengage from both the motor/generator gear 78 and the ring gear 30; and in this configuration, one linear actuator 92 can be utilized. In yet another configuration of the starter mechanism 60, the motor/generator gear 78, the second shaft 86 and the second starter gear 80 are eliminated, with the first shaft 82 and the motor/generator shaft 44 being concentric with each other, and the first starter gear 76 movable along the motor/generator shaft 44 to engage and disengage the ring gear 30.

For these other embodiments, the first starter gear 76 can be coupleable to the motor/generator shaft 44 through various shafts and/or selective/continuous engagement of gears. Furthermore, for all of the embodiments, coupleable can include selective coupling of various components and/or continuous coupling of various components.

With regard to the FIG. 1 embodiment, the first energy storage device 40 can be a varying load battery, which can provide a wide range of voltage to supply current to the motor/generator and the auxiliary electric system 56. When the first energy storage device 40 provides voltage within a range suitable for the auxiliary electric system 56, then the electrical component 64 can be eliminated in this embodiment. For example, the auxiliary electric system 56 can run on a range of voltage from about 10 volts to about 16 volts. Therefore, when the first energy storage device 40 can supply voltage to the auxiliary electric system 56 within the above range, then, for example, the DC-DC converter can be eliminated.

Continuing with the FIG. 1 embodiment, various operations of the vehicle 10 can occur by opening and closing the first switching device 62, and depending on which mode the motor-generator 38 is being operated in. Generally, the first switching device 62 is in the first open state to minimize overcharging of the first energy storage device 40 or to minimize overdischarging the first energy storage device 40. As another example, when the first switching device 62 is in the first open state and the motor-generator 38 is operating in the generating mode the motor-generator 38 can supply low-voltage current to the auxiliary electric system 56 while bypassing the first energy storage device 40. In other words, the motor-generator 38 can supply current directly to the auxiliary electric system 56 without passing through the first energy storage device 40.

Continuing with the FIG. 1 embodiment and turning to the first closed state, for example, when the first switching device 62 is in the first closed state and the engine 14 of the vehicle 10 is off, current can flow from the first energy storage device 40 to power the auxiliary electric system 56. As another example, when the first switching device 62 is in the first closed state and the motor-generator 38 is operating in the generating mode, current can flow to the first energy storage device 40 to recharge the first energy storage device 40. As yet another example, when the first switching device 62 is in the first closed state and the motor-generator 38 is operating in the generating mode, current can flow from the first energy storage device 40 to the auxiliary electric system 56 to support various auxiliary loads when the engine 14 is off.

Continuing with the first closed state of FIG. 1, furthermore, when the motor-generator 38 is in the torque assist mode or the regenerative braking mode, the first switching device 62 can be in the first closed state when the state of the charge of the first energy storage device 40 is within a predetermined range. Additionally, for all starts of the engine 14, whether being started after a short period of time (such as at a stop light, etc.) or an extended period of time (such as overnight, etc.), the first switching device 62 is in the first closed state to supply current to the motor-generator 38 to turn the motor/generator shaft 44 which turns the first and second starter gears 76, 80 to rotate the ring gear 30 and the crankshaft 22.

The difference between the embodiments of FIGS. 1 and 2 is that the powertrain 12B of FIG. 2 includes the second energy storage device 42 and the second switching device 68. Turning specifically to the powertrain 12B embodiment of FIG. 2, the second energy storage device 42 is disposed in a parallel electrical relationship with the first energy storage device 40, the motor-generator 38 and the auxiliary electric system 56. Furthermore, the second switching device 68 is selectively transitionable between the second open state to electrically disconnect the second energy storage device 42 from at least one of the motor-generator and the auxiliary electric system, and the second closed state to electrically connect the second energy storage device 42 to at least one of the motor-generator 38 and the auxiliary electric system 56. Electrical communication between the motor-generator 38 and the auxiliary electric system 56 is independent of the second switching device 68 being in the second open and closed states. The interpretation of "at least one of" has been discussed above and will not be repeated here.

Continuing with the FIG. 2 embodiment, various operations of the vehicle 10 can occur by opening and closing the first and second switching devices 62, 68, and depending on which mode the motor-generator 38 is being operated in. Generally, the first switching device 62 is in the first open state to minimize overcharging of the first energy storage device 40 or to minimize overdischarging the first energy storage device 40. Additionally, the first switching device 62 is in the first open state during cold starts of the engine 14 (cold start can be when the engine 14 has been shut off for an extended period of time, e.g., shut off overnight). Furthermore, when the motor-generator 38 is in the torque assist mode or the regenerative braking mode, the first switching device 62 can be in the first closed state when the state of the charge of the first energy storage device 40 is within a predetermined range or when low-voltage current is being supplied by the first energy storage device 40 to the auxiliary electric system 56.

As another example, when the second switching device 68 is in the second open state and the motor-generator 38 is operating in the regenerative braking mode, the motor-generator 38 can supply low-voltage current to the auxiliary electric system 56 while bypassing the second energy storage device 42. In other words, the motor-generator 38 can supply current directly to the auxiliary electric system 56 without passing through the second energy storage device 42.

Furthermore, for example, when the second switching device 68 is in the second closed state and the engine 14 of the vehicle 10 is off, current can flow from the second energy storage device 42 to power the auxiliary electric system 56. As yet another example, when the second switching device 68 is in the second closed state and the motor-generator 38 is operating in the generating mode, current can flow to the second energy storage device 42 to recharge the second energy storage device 42. As yet another example, when the second switching device 68 is in the second closed state and the motor-generator 38 is operating in the generating mode, current can flow from the second energy storage device 42 to the auxiliary electric system 56 to support various auxiliary loads when the engine 14 is off.

Continuing with the operations for the FIG. 2 embodiment, as another example, when the engine 14 of the vehicle 10 is off, the second switching device 68 is in the second open state and the first switching device 62 is in the first closed state, the first energy storage device 40 can supply low-voltage current to the auxiliary electric system 56 while bypassing the second energy storage device 42. As another example, the first and second switching devices 62, 68 can be in the first and second open states respectively when the motor-generator 38 alone is supplying the current to the auxiliary electric system 56. In other words, the motor-generator 38 can supply current directly to the auxiliary electric system 56 without passing through the first and second energy storage devices 40, 42.

Additionally, to enhance starting of the engine 14, the first and second switching devices 62, 68 can be in the first and second closed states respectively when the voltages of the first and second energy storage devices 40, 42 are substantially the same to supply current to the motor-generator 38 to turn the motor/generator shaft 44 which turns the first and second starter gears 76, 80 to rotate the ring gear 30 and the crankshaft 22. As another example, the first and second switching devices 62, 68 can be in the first and second closed states respectively to maximize recuperation of current during the regenerative braking mode.

With regard to the operations of the FIG. 5 embodiment, this embodiment operates the same as discussed immediately above for the operations of the FIG. 2 embodiment, except that the starter mechanism 60 utilizes the starter clutch 74 to start the engine 14 instead of the first and second shafts 82, 86 configuration of FIG. 2. Therefore, the operations of the embodiment of FIG. 5 is discussed above and will not be re-discussed. When the starter clutch 74 is utilized in a one energy storage device 40 embodiment, the operations are the same as the operations of the FIG. 1 embodiment, except that the starter mechanism 60 utilizes the starter clutch 74 to start the engine 14 instead of the first and second shafts 82, 86 configuration of FIG. 1.

Turning to the powertrain 12C, 12D for the embodiments of FIGS. 3 and 4, the starter mechanism 60 operates independently of the motor-generator 38 to selectively start the engine 14. In other words, the motor-generator 38 does not assist the starter mechanism 60 to start the engine 14, and thus, the starter mechanism 60 can exclusively starts the engine 14. In other words, the starter mechanism 60 does not utilize the motor-generator 38 as the motor to rotate the first starter gear 76. Generally, the motor/generator clutch 70 can be eliminated in these embodiments. The starter mechanism 60 starts the engine 14 when the engine 14 has been shut off for an extended period of time (such as overnight) or been shut off for a short period of time (such as shut off at a stop light, etc.). The motor-generator 38 is coupled to the engine 14 through the endless rotatable device 58 and not through the starter mechanism 60 as other embodiments.

For FIGS. 3 and 4, if the motor-generator 38 has sufficient torque output and sufficient mechanical advantage through the endless rotatable device 58, then the motor-generator 38 can start, or assist in starting, the engine 14, such as restarts at a stop light. Therefore, generally, in the embodiments of FIGS. 3 and 4, the motor-generator 38 operates as a torque assist or as a generator. When the motor-generator 38 is in the torque assist mode, the motor-generator 38 can operate as a motor to provide additional torque to the wheels 20. Furthermore, the motor-generator 38 can operate as a generator in the generating mode or the regenerative braking mode.

Continuing with the embodiments of FIGS. 3 and 4, the starter mechanism 60 can include a motor 94 and the first starter gear 76 engagable with the ring gear 30 to selectively rotate the ring gear 30 to transfer toque to the crankshaft 22. The first starter gear 76 is coupled to the motor 94 of the starter mechanism 60 such that the motor 94 selectively rotates the first starter gear 76. Therefore, the starter mechanism 60 operates independently of the motor-generator 38.

The starter mechanism 60 can include the linear actuator 92 to move the first starter gear 76 along the second axis 84 into and out of engagement with the ring gear 30. Therefore, the starter mechanism 60 is coupled to the engine 14 when the first starter gear 76 engages the ring gear 30. The linear actuator 92 can be various configurations, and non-limiting examples can include a solenoid, an electric motor driving a ball-screw mechanism, a shape-memory alloy actuator, an electro-active polymer actuator, etc. The solenoid is described in detail above and will not be re-discussed. For the shape-memory alloy actuator, selectively energizing the material, such as the alloy, can change the shape of the material which causes the first starter gear 76 to move along the second axis 84. For the electro-active polymer actuator, selectively energizing the material, such as the polymer, can change the shape of the material to move the first starter gear 76 along the second axis 84.

The starter mechanism 60 is disposed in a parallel electrical relationship with the motor-generator 38 and the auxiliary electric system 56. In other words, the starter mechanism 60 is disposed in a parallel circuit arrangement with the motor-generator 38 and the auxiliary electric system 56.

Optionally, the powertrain 12C, 12D for the embodiments of FIGS. 3 and 4 can include the electrical component 64 disposed downstream to the motor-generator 38, the starter mechanism 60 and the first energy storage device 40 along the electrical bus 63. Again, the downstream direction is shown by the arrow 66 in FIGS. 3 and 4. Furthermore, the electrical component 64 is disposed upstream to the auxiliary electric system 56 along the electrical bus 63. When the electrical component 64 includes the DC-DC converter, the DC-DC converter regulates the amount of voltage delivered to the auxiliary electric system 56. As indicated above, the electrical component 64 is optional in certain situations.

With regard to the FIG. 3 embodiment, the first energy storage device 40 can be a varying load battery, which can provide a wide range of voltage to supply current to the motor-generator 38, the starter mechanism 60 and the auxiliary electric system 56. When the first energy storage device 40 provides voltage within a range suitable for the auxiliary electric system 56, then the electrical component 64 can be eliminated in this embodiment. For example, the auxiliary electric system 56 can run on a range of voltage from about 10 volts to about 16 volts. Therefore, when the first energy storage device 40 can supply voltage to the auxiliary electric system 56 within the above range, for example, during engine restarts and torque assist, then the DC-DC converter can be eliminated.

Continuing with the FIG. 3 embodiment, various operations of the vehicle 10 can occur by opening and closing the first switching device 62, and depending on which mode the motor-generator 38 is being operated in. Generally, the first switching device 62 is in the first open state to minimize overcharging of the first energy storage device 40 or to minimize overdischarging the first energy storage device 40. For example, when the first switching device 62 is in the first open state and the motor-generator 38 is operating in the generating mode, the motor-generator 38 can supply low-voltage current to the auxiliary electric system 56 while bypassing the first energy storage device 40. In other words, the motor-generator 38 can supply current directly to the auxiliary electric system 56 without passing through the first energy storage device 40.

Continuing with the FIG. 3 embodiment and turning to the first closed state, for example, when the first switching device 62 is in the first closed state and the engine 14 of the vehicle 10 is off, current can flow from the first energy storage device 40 to power the auxiliary electric system 56. As another example, when the first switching device 62 is in the first closed state and the motor-generator 38 is operating in the generating mode, current can flow to the first energy storage device 40 to recharge the first energy storage device 40. As yet another example, when the first switching device 62 is in the first closed state and the motor-generator 38 is operating in the generating mode, current can flow from the first energy storage device 40 to the auxiliary electric system 56 to support various auxiliary loads when the engine 14 is off.

Continuing with the first closed state of FIG. 3, furthermore, when the motor-generator 38 is in the torque assist mode or the regenerative braking mode, the first switching device 62 can be in the first closed state when the state of the charge of the first energy storage device 40 is within a predetermined range. Furthermore, the first switching device 62 can be in the first closed state when the state of the charge of the first energy storage device 40 is within a predetermined range during the starter mechanism 60 starting the engine 14. Additionally, to start the engine 14 when the vehicle 10 has been off for an extended period of time, the first switching device 62 is in the first closed state to supply current to the starter mechanism 60 to actuate the motor 94 (of the starter mechanism 60) to turn the first starter gear 76 to rotate the ring gear 30 and the crankshaft 22.

The difference between the embodiments of FIGS. 3 and 4 is that the powertrain 12C, 12D of FIG. 4 includes the second energy storage device 42 and the second switching device 68. Turning specifically to the powertrain 12D embodiment of FIG. 4, the second energy storage device 42 is disposed in a parallel electrical relationship with the first energy storage device 40, the motor-generator 38, the starter mechanism 60 and the auxiliary electric system 56. Furthermore, the second switching device 68 is selectively transitionable between the second open state to electrically disconnect the second energy storage device 42 from at least one of the motor-generator 38 and the auxiliary electric system 56, and the second closed state to electrically connect the second energy storage device 42 to at least one of the motor-generator 38 and the auxiliary electric system 56. Electrical communication between the motor-generator 38 and the auxiliary electric system 56 is independent of the second switching device 68 being in the second open and closed states. The interpretation of the phrase "at least one of" has been discussed above and will not be repeated here.

Continuing with the powertrain 12D embodiment of FIG. 4, the starter mechanism 60 is disposed in a parallel electrical relationship with the motor-generator 38, the second energy storage device 42 and the auxiliary electric system 56. When utilizing the electrical component 64 with two energy storage devices 40, 42 of this embodiment, the electrical component 64 is disposed downstream to the motor-generator 38, the starter mechanism 60 and the first energy storage device 40 along the electrical bus 63. Furthermore, the electrical component 64 is disposed upstream to the second energy storage device 42 and the auxiliary electric system 56 along the electrical bus 63.

Continuing with the FIG. 4 embodiment, various operations of the vehicle 10 can occur by opening and closing the first and second switching devices 62, 68, and depending on which mode the motor-generator 38 is being operated in. Generally, the first switching device 62 is in the first open state to minimize overcharging of the first energy storage device 40 or to minimize overdischarging the first energy storage device 40. Additionally, the first switching device 62 is in the first open state during cold starts of the engine 14, such as when the vehicle 10 has been shut off for an extended period of time, e.g., shut off overnight. Furthermore, when the motor-generator 38 is in the torque assist mode or the regenerative braking mode, the first switching device 62 can be in the first closed state when the state of the charge of the first energy storage device 40 is within a predetermined range or when low-voltage current is being supplied by the first energy storage device 40 to the auxiliary electric system 56.

As another example, when the second switching device 68 is in the second open state and the motor-generator 38 is operating in the regenerative braking mode, the motor-generator 38 can supply low-voltage current to the auxiliary electric system 56 while bypassing the second energy storage device 42. In other words, the motor-generator 38 can supply current directly to the auxiliary electric system 56 without passing through the second energy storage device 42.

Furthermore, for example, when the second switching device 68 is in the second closed state and the engine 14 of the vehicle 10 is off, current can flow from the second energy storage device 42 to power the auxiliary electric system 56. As another example, when the second switching device 68 is in the second closed state and cold start of the engine 14 is occuring (e.g., the engine 14 is being started after being shut off for an extended period of time), current can flow from the second energy storage device 42 to power the auxiliary electric system 56. Additionally, to start the engine 14 when the vehicle 10 has been off for an extended period of time, the first switching device 62 is in the first closed state and/or the second switching device 68 is in the second closed state to supply current to the starter mechanism 60 to actuate the motor 94 (of the starter mechanism 60) to turn the first starter gear 76 to rotate the ring gear 30 and the crankshaft 22.

Continuing with the operations for the FIG. 4 embodiment, as another example, when the engine 14 of the vehicle 10 is off, the second switching device 68 is in the second open state and the first switching device 62 is in the first closed state, the first energy storage device 40 can supply low-voltage current to the auxiliary electric system 56 while bypassing the second energy storage device 42. As yet another example, when the second switching device 68 is in the second closed state and the motor-generator 38 is operating in the generating mode, current can flow to the second energy storage device 42 to recharge the second energy storage device 42. As another example, when the second switching device 68 is in the second closed state and the motor-generator 38 is operating in the generating mode, current can flow from the second energy storage device 42 to the auxiliary electric system 56 to support various auxiliary loads when the engine 14 is off.

Again continuing with the operations for the FIG. 4 embodiment, as another example, the first and second switching devices 62, 68 can be in the first and second open states respectively when the motor-generator 38 alone is supplying the current to the auxiliary electric system 56. In other words, the motor-generator 38 can supply current directly to the auxiliary electric system 56 without passing through the first and second energy storage devices 40, 42. Additionally, to enhance cold starting of the engine 14, the first and second switching devices 62, 68 can be in the first and second closed states respectively when the voltages of the first and second energy storage devices 40, 42 are substantially the same to supply current to the motor 94 of the starter mechanism 60 to rotate the ring gear 30 and the crankshaft 22 to start the engine 14. As another example, the first and second switching devices 62, 68 can be in the first and second closed states respectively to maximize recuperation of current during the regenerative braking mode of the motor-generator 38.

The powertrain 12A, 12B, 12C, 12D, 12E of each of the embodiments can further include a controller 96, which can be part of an electronic control module that is in communication with various components of the vehicle 10. Generally, the controller 96 signals various components of the vehicle 10 to selectively operate, some of which are discussed below. It is to be appreciated that more than one controller 96 can be utilized.

The controller 96 includes a processor 98 and a memory 100 on which is recorded instructions for communicating with the motor-generator 38, the starter mechanism 60, the first and/or second energy storage devices 40, 42, the first and/or second switching devices 62, 68, etc. The controller 96 is configured to execute the instructions from the memory 100, via the processor 98. For example, the controller 96 can be a host machine or distributed system, e.g., a computer such as a digital computer or microcomputer, acting as a vehicle control module, and/or as a proportional-integral-derivative (PID) controller device having a processor, and, as the memory 100, tangible, non-transitory computer-readable memory such as read-only memory (ROM) or flash memory. The controller 96 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 96 can include all software, hardware, memory 100, algorithms, connections, sensors, etc., necessary to monitor and control the motor-generator 38, the starter mechanism 60, the first and/or second switching devices 62, 68, etc. Furthermore, the controller 96 can include all software, hardware, memory 100, algorithms, connections, sensors, etc., necessary to monitor the first and/or second energy storage devices 40, 42. As such, a control method can be embodied as software or firmware associated with the controller 96. It is to be appreciated that the controller 96 can also include any device capable of analyzing data from various sensors, comparing data, making the necessary decisions required to control and monitor the motor-generator 38, the starter mechanism 60, the first and/or second switching devices 62, 68, etc., as well as monitor the first and/or second energy storage devices 40, 42.

For the embodiments of FIGS. 1-5, the controller 96 is in communication with the motor-generator 38, the starter mechanism 60 and the first switching device 62 to selectively operate the motor-generator 38, the starter mechanism 60 and the first switching device 62. For all of these embodiments, the controller 96 selectively signals the first switching device 62 to establish one of the first open state and the first closed state. Therefore, depending on the desired operation, the controller 96 signals the first switching device 62 to be in one of the first open and closed states. For example, the controller 96 can signal the motor-generator 38 to operate in the generating mode, the torque assist mode, the regenerative braking mode, to start the engine 14, etc.

Furthermore, the controller 96 can be in communication with the first energy storage device 40. When the first switching device 62 is in the first closed state, current can flow into the first energy storage device 40 or flow out of the first energy storage device 40, and the controller 96 can monitor the amount of current in the first energy storage device 40. Additionally, for these embodiments, the controller 96 can be in communication with the integrated power inverter 54, and when utilizing the electrical component 64, the controller 96 can be in communication with the electrical component 64.

For the embodiments of FIGS. 2, 4 and 5, the controller 96 can also be in communication with the second energy storage device 42. Furthermore, for the embodiments of FIGS. 2, 4 and 5, the controller 96 can be in communication with the second switching device 68 to selectively signal the second switching device 68 to establish one of the second open state and the second closed state. Therefore, depending on the desired operation, the controller 96 signals the second switching device 68 to be in one of the second open and closed states. When the second switching device 68 is in the second closed state, current can flow into the second energy storage device 42 or flow out of the second energy storage device 42, and the controller 96 can monitor the amount of current in the second energy storage device 42.

The controller 96 for the embodiments of FIGS. 1-5 received current from the first energy storage device 40. Specifically, the controller 96 remains in electrical communication with the first energy storage device 40 independently of which state the first switching device 62 is in. In other words, the electrical connection to the controller 96 is disposed between the first energy storage device 40 and the first switching device 62 such that current can continuously flow to the controller 96 without being affected by the state that the first switching device 62 is in.

As mentioned above, the controller 96 can be in communication with the starter mechanism 60 to selectively actuate the starter mechanism 60. For the embodiments with the starter mechanism 60 including the linear actuator 92, the controller 96 is in communication with the linear actuator 92. Specifically, current is supplied to the linear actuator 92 through the controller 96, as shown in the FIGS. 1 and 2, to selectively actuate the linear actuator 92. For example, for FIGS. 1 and 2, when the linear actuators 92 are actuated, the first and second starter gears 76, 80 can move along the second axis 84 into engagement with the ring gear 30 and the motor/generator gear 78 respectively. Furthermore, for FIGS. 1, 2 and 5, current is supplied to the solenoid 72 of the motor/generator clutch 70 through the controller 96 to selectively actuate the motor/generator clutch 70. It is to be appreciated that current can be supplied to the linear actuator (s) 92 and/or the motor/generator clutch 70 from the electrical bus 63 directly instead of through the controller 96 and the controller 96 will still remain in communication with these components to control/monitor these components.

Additionally, for the embodiments with the starter mechanism 60 including the motor 94 and the linear actuator 92 (see FIGS. 3 and 4), current is supplied to the motor 94 by the first and/or second energy storage devices 40, 42, and current is supplied to the linear actuator 92 through the controller 96. For example, for FIGS. 3 and 4, when the linear actuator 92 is actuated, the first starter gear 76 can move along the second axis 84 into engagement with the ring gear 30. It is to be appreciated that current can be supplied to the linear actuator 92 from the electrical bus 63 directly instead of through the controller 96 and the controller 96 will still remain in communication with the linear actuator 92 to control/monitor this component.

Furthermore, for the embodiment with the starter mechanism 60 including the starter clutch 74 (see FIG. 5), the controller 96 is in communication with the solenoid 75 of the starter clutch 74. Specifically, current is supplied to the solenoid 75 of the starter clutch 74 through the controller 96 as shown in FIG. 5 to selectively actuate the starter clutch 74. It is to be appreciated that current can be supplied to the starter clutch 74 from the electrical bus 63 directly instead of through the controller 96 and the controller 96 will still remain in communication with the starter clutch 74 to control/monitor this component.

As shown in FIGS. 6 and 7, the motor-generator 38 and the starter mechanism 60 can be in other configurations than shown in FIGS. 1-5. FIGS. 6 and 7 are similar to the embodiments of FIGS. 1, 2 and 5, in that the motor-generator 38 provides the motor that selectively transfers torque through the starter mechanism 60 to the crankshaft 22 to start the engine 14. FIGS. 6 and 7 are different from FIGS. 1-5 in that the endless rotatable device 58 and the motor/generator pulley 48 are eliminated in FIGS. 6 and 7. Therefore, in these embodiments, the motor-generator 38 is coupleable to the engine 14 through the starter mechanism 60. In FIGS. 6 and 7, the motor-generator 38 and the starter mechanism 60 are coupled to each other. Specifically, the motor-generator 38 and the starter mechanism 60 are coupled to each other through the motor/generator shaft 44. It is to be appreciated, as discussed above, the motor/generator shaft 44 can be split into more than one piece, e.g., more than one piece to accommodate the operation of one or more clutches, etc.

For FIGS. 6 and 7, the starter mechanism 60 is coupleable to the engine 14 through engagement of gears, such as the first starter gear 76 with the ring gear 30. For the embodiment of FIG. 7, the first starter gear 76 and the ring gear 30 can be disposed inside the starter mechanism 60. The first starter gear 76 can remain in continuous engagement with the ring gear 30, or alternatively, the first starter gear 76 can be movable back or forth along the second axis 84 to selectively engage or mesh with the ring gear 30. When the first starter gear 76 is movable along the second axis 84, the linear actuator 92 can be utilized. In yet another alternative, the first starter gear 76 can be coupled to the ring gear 30 through one or more additional gears.

In the configuration of FIGS. 6 and 7, the starter mechanism 60 can be a gearbox including one or more gears, a planetary gear set, one or more clutches and/or one or more brakes, etc. Alternatively, the starter mechanism 60, for FIG. 6, can be a pulley system or a continuous variable transmission (CVT), etc. One suitable gearbox for FIGS. 6 and 7 is a two-speed gearbox. The CVT can include a plurality of pulleys utilizing an endless rotatable device, such as a belt, etc., to transfer torque between the pulleys, and thus selectively transfer torque from the motor/generator shaft 44 to the first starter gear 76. Therefore, alternatively, the starter mechanism 60 can be coupleable to the engine 14 through the CVT components.

The starter mechanism 60, as discussed above, can be in communication with the controller 96. For example, the controller 96 can communicate with the gearbox to select a low gear ratio for generation and a high gear ratio for starting (the high gear ratio being greater than the low gear ratio). For the CVT, an actuator of the CVT is in communication with the controller 96, and the actuator can be actuated to continuously adjust the pulleys of the CVT to change the gear ratio for generation and starting.

In one embodiment, the electrical circuitry of FIG. 3, which utilizes one energy storage device 40, can be utilized for FIGS. 6 and 7, with the motor-generator 38 and the starter mechanism 60 of FIG. 3 being replaced with the motor-generator 38 and the starter mechanism of FIG. 6 or FIG. 7. In another embodiment, the electrical circuitry of FIG. 4, which utilizes two energy storage devices 40, 42, can be utilized for FIGS. 6 and 7, with the motor-generator 38 and the starter mechanism 60 of FIG. 4 being replaced with the motor-generator 38 and the starter mechanism of FIG. 6 or FIG. 7. Therefore, the operations of the powertrains 12C, 12D discussed above for FIGS. 3 and 4 apply to FIGS. 6 and 7 which utilizes the motor-generator 38 and the starter mechanism 60 of FIGS. 6 and 7.

For the embodiments of FIGS. 6 and 7, one suitable motor-generator 38 is a brushless electric motor-generator. Additionally, the motor-generator 38 can be an alternating current (AC) motor-generator or any other suitable motor-generator. Torque being outputted from the AC motor-generator 38 can be from about 15.0 newton meter (Nm) to about 25.0 Nm. As another example, the torque being outputted from the AC motor-generator 38 can be from about 15.0 Nm to about 20.0 Nm. The motor-generator 38 provides reduced maximum torque requirement, (as compared, for example, to a BAS as discussed in the background section), which allows the mass size of the motor-generator 38 to be decreased and also allows reduced power requirements of the motor-generator 38. It is to be appreciated that the torque being outputted from the motor-generator 38 can be values other than identified above.

The Figures are shown for illustrative purposes only and the spacing between the components can be such that the first and second starter gears 76, 80, discussed above, can move back or forth along the second axis 84 to selectively engage or mesh with the ring gear 30 and the motor/generator gear 78 respectively. For example, the first starter gear 76 can move along the second axis 84 away from the motor-generator 38 out of engagement with the ring gear 30 or can move toward the motor-generator 38 out of engagement with the ring gear 30. As a similar example, the second starter gear 80 can move along the second axis 84 toward the motor-generator 38 out of engagement with the motor/generator gear 78 or can move away from the motor-generator 38 out of engagement with the motor/generator gear 78.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electrical system comprising:
   an engine;
   a motor-generator;
   a starter mechanism;
   a first energy storage device having a first voltage level;
   a second energy storage device having a second voltage level less than the first voltage level;
   a first switching device selectively transitionable between a first open state and a first closed state;
   a second switching device selectively transitionable between a second open state and a second closed state;
   a controller including a processor and a memory having recorded instructions, wherein the controller is configured to control the motor-generator, the starter mechanism and the first and second switching devices, and wherein current from at least one of the first and second energy storage devices is delivered to the motor-generator when at least one of the first switching device is in the first closed state and the second switching device is in the second closed state such that the motor-generator transfers torque to the starter mechanism and the starter mechanism uses the torque to start the engine.

2. The system as set forth in claim 1 further including an auxiliary electric system in electrical communication with the motor-generator, and wherein the motor-generator and the auxiliary electric system are in electrical communication regardless of the first switching device being in the first open and closed states.

3. The system as set forth in claim 1 wherein the first energy storage device is a high-voltage energy storage device having the first voltage level, and the second energy storage device is a low-voltage energy storage device having the second voltage level, with at least one of the high-voltage energy storage device and the low-voltage energy storage device selectively in electrical communication with the motor-generator.

4. An engine system comprising:
   an engine including a housing and a crankshaft at least partially disposed inside the housing;
   a motor-generator disposed outside of the housing;
   a starter mechanism coupleable to the engine;
   an auxiliary electric system operatively connected to the motor-generator, wherein the motor-generator is operable in a predetermined operating mode in which the motor-generator alone supplies current to the auxiliary electric system;
   a first energy storage device disposed in a parallel electrical relationship with the motor-generator and the auxiliary electric system;
   a first switching device selectively transitionable between a first open state to electrically disconnect the first energy storage device from the motor-generator and the auxiliary electric system, and a first closed state to electrically connect the first energy storage device to at least one of the motor-generator and the auxiliary electric system; and
   wherein current from the first energy storage device is delivered to at least one of the motor-generator and the starter mechanism when the first switching device is in the first closed state such that the starter mechanism starts the engine.

5. The system as set forth in claim 4 further including an electrical bus and an electrical ground, wherein the first energy storage device is disposed between the electrical bus and the electrical ground, and the first switching device is disposed between the first energy storage device and the electrical bus such that the first energy storage device is in direct electrical communication with the electrical bus when the first switching device is in the first closed state.

6. The system as set forth in claim 4 further including a second energy storage device disposed in a parallel electrical relationship with the first energy storage device, the motor-generator and the auxiliary electric system.

7. The system as set forth in claim 6 wherein the first energy storage device has a first voltage level and the second energy storage device has a second voltage level less than the first voltage level, and wherein the second energy storage device is in electrical communication with the auxiliary electric system.

8. The system as set forth in claim 7 further including a second switching device selectively transitionable between a second open state to electrically disconnect the second energy storage device from the motor-generator and the auxiliary electric system, and a second closed state to electrically connect the second energy storage device to at least one of the motor-generator and the auxiliary electric system.

9. The system as set forth in claim 8 further including an electrical bus and an electrical ground, wherein the second energy storage device is disposed between the electrical bus and the electrical ground, and the second switching device is disposed between the second energy storage device and the electrical bus such that the second energy storage device is in direct electrical communication with the electrical bus when the second switching device is in the second closed state.

10. The system as set forth in claim 4 wherein the starter mechanism includes as a starter clutch, and wherein the motor-generator includes a motor/generator clutch.

11. The system as set forth in claim 4 wherein the motor-generator and the starter mechanism are selectively geared to each other to start the engine.

12. The system as set forth in claim 4 wherein the starter mechanism operates independently of the motor-generator to selective start the engine.

13. A powertrain as set forth in claim 4 wherein:
the motor-generator operates without a motor/generator clutch;
a DC-DC converter is absent; and
the first energy storage device is a varying load battery.

14. A powertrain as set forth in claim 4:
wherein the engine includes a crankshaft rotatable about a longitudinal axis;
further including a ring gear attached to a first distal end of the crankshaft such that the ring gear and the crankshaft are rotatable in unison about the longitudinal axis;
further including a crankshaft pulley coupleable to a second distal end of the crankshaft such that the crankshaft pulley and the crankshaft are rotatable in unison about the longitudinal axis;
wherein the motor-generator includes a motor/generator pulley being rotatable about a first axis; and
further including an endless rotatable device disposed about the crankshaft pulley and the motor/generator pulley to transfer rotational movement between the crankshaft pulley and the motor/generator pulley when the motor-generator operates to start the engine.

15. A powertrain as set forth in claim 14:
wherein the starter mechanism is operable to selectively start the engine independently of the motor-generator through the ring gear; and
wherein the motor-generator operates to selectively start the engine independently of the starter mechanism through the endless rotatable device.

16. An engine system comprising:
an engine including a housing and a crankshaft at least partially disposed inside the housing;
a motor-generator disposed outside of the housing;
a gearbox coupleable to the engine;
an auxiliary electric system operatively connected to the motor-generator, wherein the motor-generator is operable in a predetermined operating mode in which the motor-generator alone supplies current to the auxiliary electric system;
a first energy storage device disposed in a parallel electrical relationship with the motor-generator and the auxiliary electric system;
a first switching device selectively transitionable between a first open state to electrically disconnect the first energy storage device from the motor-generator and the auxiliary electric system, and a first closed state to electrically connect the first energy storage device to at least one of the motor-generator and the auxiliary electric system; and
wherein current from the first energy storage device is delivered to at least one of the motor-generator and the gearbox when the first switching device is in the first closed state such that the gearbox starts the engine.

17. The system as set forth in claim 16 wherein the gearbox includes a two-speed gearbox.

18. The system as set forth in claim 16 wherein the gearbox includes a continuous variable transmission.

19. The system as set forth in claim 16 wherein the gearbox includes a planetary gear set.

20. The system as set forth in claim 16 wherein the gearbox includes a clutch.

* * * * *